United States Patent
Dhanda et al.

(10) Patent No.: US 8,724,248 B2
(45) Date of Patent: May 13, 2014

(54) METHOD AND APPARATUS FOR COMPENSATING VIBRATION BY ADJUSTING TRACK PITCH

(75) Inventors: Abhishek Dhanda, San Jose, CA (US); Toshiki Hirano, San Jose, CA (US); Tetsuo Semba, San Jose, CA (US); Zvonimir Z. Bandic, San Jose, CA (US)

(73) Assignee: HGST Netherlands B.V., Amsterdam (NL)

( * ) Notice: Subject to any disclaimer, the term of this patent is extended or adjusted under 35 U.S.C. 154(b) by 146 days.

(21) Appl. No.: 13/306,736

(22) Filed: Nov. 29, 2011

(65) Prior Publication Data

US 2013/0135764 A1 May 30, 2013

(51) Int. Cl.
*G11B 21/02* (2006.01)

(52) U.S. Cl.
USPC .............................................. 360/75; 360/31

(58) Field of Classification Search
USPC ................... 360/75, 55, 77.02, 78.04, 77.06
See application file for complete search history.

(56) References Cited

U.S. PATENT DOCUMENTS

| | | | | |
|---|---|---|---|---|
| 5,930,069 | A * | 7/1999 | Kim | 360/78.14 |
| 6,344,942 | B1 * | 2/2002 | Yarmchuk | 360/75 |
| 6,384,997 | B1 | 5/2002 | Wu et al. | |
| 6,760,172 | B1 * | 7/2004 | Hamaguchi et al. | 360/48 |
| 6,795,262 | B1 | 9/2004 | Codilian et al. | |
| 7,620,772 | B1 | 11/2009 | Liikanen et al. | |
| 2002/0131188 | A1 * | 9/2002 | Hamaguchi et al. | 360/31 |
| 2004/0080863 | A1 * | 4/2004 | Nakagawa | 360/78.08 |
| 2009/0251819 | A1 | 10/2009 | Lee et al. | |
| 2009/0284862 | A1 * | 11/2009 | Yamamoto et al. | 360/75 |
| 2011/0075286 | A1 * | 3/2011 | Duan et al. | 360/31 |

FOREIGN PATENT DOCUMENTS

JP 2003016745 A 1/2003

* cited by examiner

*Primary Examiner* — Tan X Dinh
(74) *Attorney, Agent, or Firm* — Joan Pennington (57) ABSTRACT

A method, apparatus and a data storage device are provided for implementing data track pitch adjustment for data written on a recordable surface of a storage device under operational vibration conditions. An operational vibration disturbance spectrum is detected during a write operation and the data track pitch is selectively adjusted based on the detected operational vibration disturbance spectrum. The adjusted track pitch information is saved and used during a read operation.

18 Claims, 13 Drawing Sheets

METHOD AND APPARATUS FOR COMPENSATING VIBRATION BY ADJUSTING TRACK PITCH

FIELD OF THE INVENTION

The present invention relates generally to the data storage field, and more particularly, relates to a method, apparatus and a data storage device for implementing data track pitch adjustment for data written on a recordable surface of a storage device under operational vibration conditions.

DESCRIPTION OF THE RELATED ART

Many data processing applications require long-term data storage and typically a high-degree of data integrity. Typically these needs are met by non-volatile data storage devices.

Non-volatile storage or persistent media can be provided by a variety of devices, most commonly, by direct access storage devices (DASDs), which also are referred to as hard disk drives (HDDs).

The hard disk drives (HDDs) advantageously include Shingled Disk Drives (SDDs) to achieve high track density. A Shingled Disk Drive (SDD) is a hard disk drive recording magnetic patterns of data on a writable disk surface in overlapping circular tracks using shingled perpendicular magnetic recording (SMR), also referred to as a SMR drive.

A key concern for vibration is the effect vibration has during data writes. Some hard drives will be installed in an inherently high-vibration environment such as among other hard drives or near a CDROM drive. Track follow and settle is more difficult in a high vibration environment.

A need exists for an effective and efficient mechanism to implement data writing on a recordable surface of a storage device under operational vibration conditions while maintaining data integrity.

SUMMARY OF THE INVENTION

Aspects of the present invention are to provide a method, apparatus and a data storage device for implementing data track pitch adjustment for data written on a recordable surface of a storage device under operational vibration conditions. Other important aspects of the present invention are to provide such method, apparatus and data storage device substantially without negative effect and to overcome some of the disadvantages of prior art arrangements.

In brief, a method, apparatus and a data storage device are provided for implementing data track pitch adjustment for data written on a recordable surface of a storage device under operational vibration conditions. An operational vibration disturbance spectrum is detected during a write operation and the data track pitch is selectively adjusted based on the detected operational vibration disturbance spectrum. The adjusted track pitch information is saved and used during a read operation.

BRIEF DESCRIPTION OF THE DRAWINGS

The present invention together with the above aspects, features, and advantages may best be understood from the following detailed description of the embodiments of the invention illustrated in the drawings, wherein.

DETAILED DESCRIPTION OF THE EMBODIMENTS

In the following detailed description of embodiments of the invention, reference is made to the accompanying drawings, which illustrate example embodiments by which the invention may be practiced. It is to be understood that other embodiments may be utilized and structural changes may be made without departing from the scope of the invention.

In accordance with features of the embodiments of the invention, methods are provided for efficiently providing adjusted track pitch for data written under operational vibration conditions, for example, for data written in overlapping, shingled data tracks on a recordable surface of a storage device, such as a hard disk drive.

In accordance with features of the embodiments of the invention, an operational vibration disturbance spectrum is detected during a write operation and the data track pitch is adjusted based on the detected disturbance spectrum. The adjusted track pitch information is saved and used during a read operation.

Figure 1:
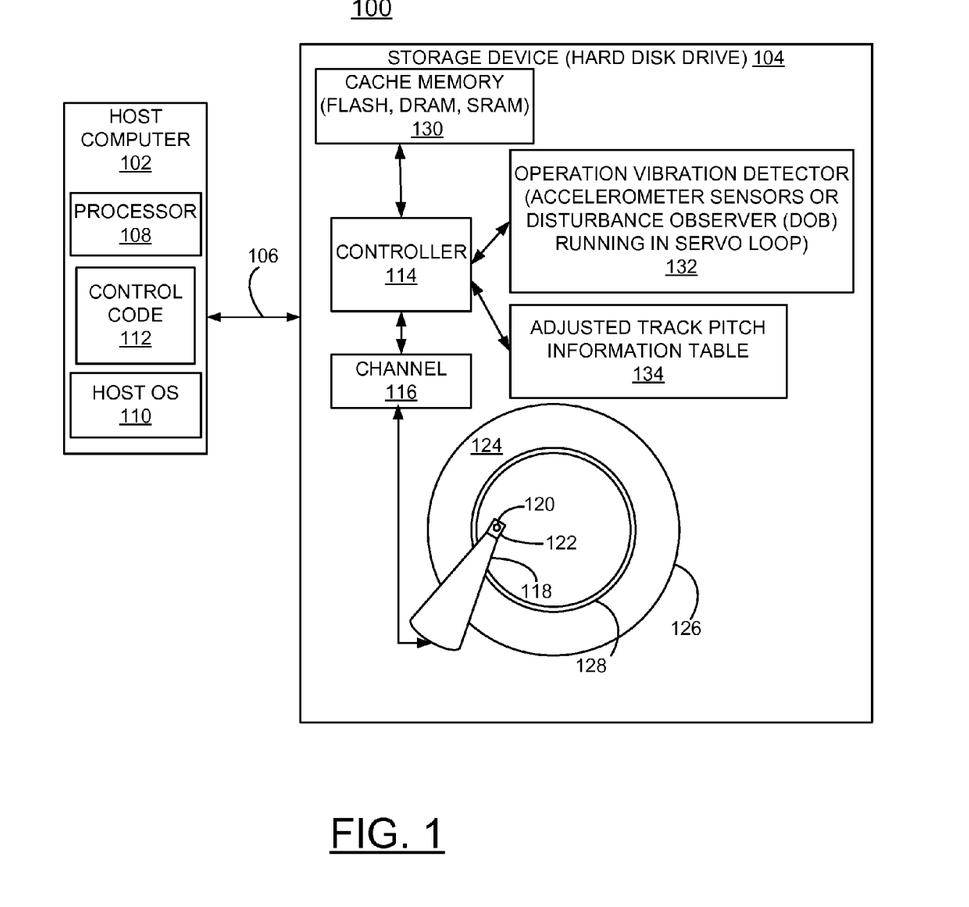
FIG. 1 is a block diagram representation illustrating a system for implementing data track pitch adjustment methods under operational vibration conditions in accordance with an embodiment of the invention.

Having reference now to the drawings, in FIG. 1, there is shown an example system generally designated by the reference character 100 for implementing data track pitch adjustment methods for data written in overlapping data tracks on a recordable surface of a storage device under operational vibration conditions in accordance with an embodiment. System 100 includes a host computer 102, a storage device 104, such as a hard disk drive 104, and an interface 106 between the host computer 102 and the storage device 104.

As shown in FIG. 1, host computer 102 includes a processor 108, a host operating system 110, and control code 112. The storage device or hard disk drive 104 includes a controller 114 coupled to a data channel 116. The storage device or hard disk drive 104 includes an arm 118 carrying a read/write head including a read element 120, and a write element 122. The hard disk drive (HDD) 104 advantageously is a Shingled Disk Drive (SDD) to achieve high track density recording magnetic patterns of data on a writable disk surface 124 in overlapping circular tracks using shingled perpendicular magnetic recording (SMR).

In operation, host operating system 110 in host computer 102 sends commands to hard disk drive 104. In response to the commands, hard disk drive 104 performs requested functions such as reading data, writing data, erasing data, and the like, on disk surface 124. The write element 122 writes magnetic patterns of data on the recordable or writable surface 124 of a disk 126. According to embodiments of the present invention, controller circuit 114 causes write element 122 to record magnetic patterns of data on a writable surface of disk 122 in overlapping circular tracks 128 implementing data track pitch adjustment under operational vibration conditions using shingled writing as illustrated and described with respect to FIG. 2.

The controller circuit 114 positions the read head 120 and write head 122 over the recordable or writable surface 124 of a disk 126 by locking a servo loop to a predetermined servo positioning pattern. The predetermined servo positioning pattern includes a preamble field, a servo sync-mark (SSM) field, a track/sector identification (ID) field, a plurality of position error signal (PES) fields, and a plurality of repeatable run out (RRO) fields follow the burst fields. The RRO fields provide head positioning information to compensate for RRO disturbance of the hard disk drive.

In accordance with embodiments of the invention, system 100 includes a cache memory 130, for example, implemented with one or a combination of a flash memory, a dynamic random access memory (DRAM) and a static random access memory (SRAM). A sensor 132 for detecting operational vibration conditions and providing operational vibration disturbance spectrum information to the controller 114, includes for example, an accelerometer or a disturbance observer (DOB), running in a servo loop of channel 116. An adjusted track pitch information table 134 stores changed track pitch information.

In accordance with embodiments of the invention, controller circuit 114 saves the adjusted or modified track pitch information for use during read operation including, for example, saving changed track pitch information in firmware tables 134 used during read operation. A copy of these tables 134 can be written to specific location on the disk to retain the information during a power off event. The controller circuit 114 optionally writes additional information in the RRO fields that for example include additional information in RRO field saving changed track pitch information as stored in firmware tables 134.

Controller 114 can include various implementations, for example, fabricated with one or multiple integrated circuit dies. A digital video recorder (DVR), a set-top-box (STB), or various other computer system types are specific implementation of a host computer 102. While the control code 112 is shown in the host computer 102, and the controller 114 is shown in the hard disk drive 104, the control code 112 may reside in any suitable location, such as the hard disk drive 104 separate from host computer 102 and controller circuit 114 may reside in any suitable location, separate from hard disk drive 104, for example, in the host computer 102, and the like.

System 100 including the host computer 102 and the storage device or hard disk drive 104 is shown in simplified form sufficient for understanding the present invention. The illustrated host computer 102 together with the storage device or hard disk drive 104 is not intended to imply architectural or functional limitations. The present invention can be used with various hardware implementations and systems and various other internal hardware devices.

Figure 2:
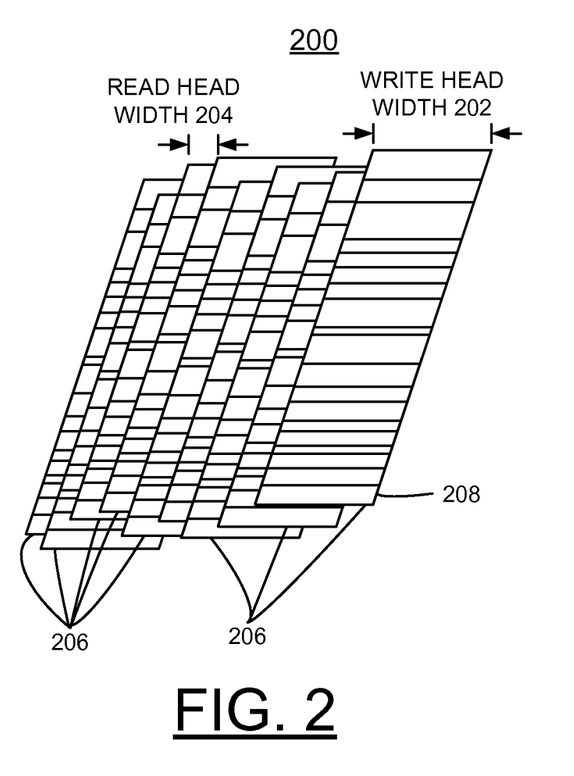
FIG. 2 schematically illustrates not to scale an example block of shingled writing in a storage device of the system of FIG. 1 in accordance with an embodiment of the invention.

FIG. 2 schematically illustrates not to scale an example block 200 of shingled writing in a storage device, or hard disk drive 104 of the system 100 in accordance with an embodiment of the invention.

As shown in FIG. 2, the write head width 202 is much wider, for example, approximately three times wider, than the width of final data tracks, and the read head width 204 is sufficiently narrow so as to read back data from only one trimmed track at a time. The data block 200 includes a plurality of overlapping data tracks 206. Each of the tracks 206 contains several sectors. Each sector contains several bytes of data. An example of a sector 208 is shown. The data block 200 includes a plurality of or a set of overlapping sectors 208, such as one or more sectors in length.

Figure 3:
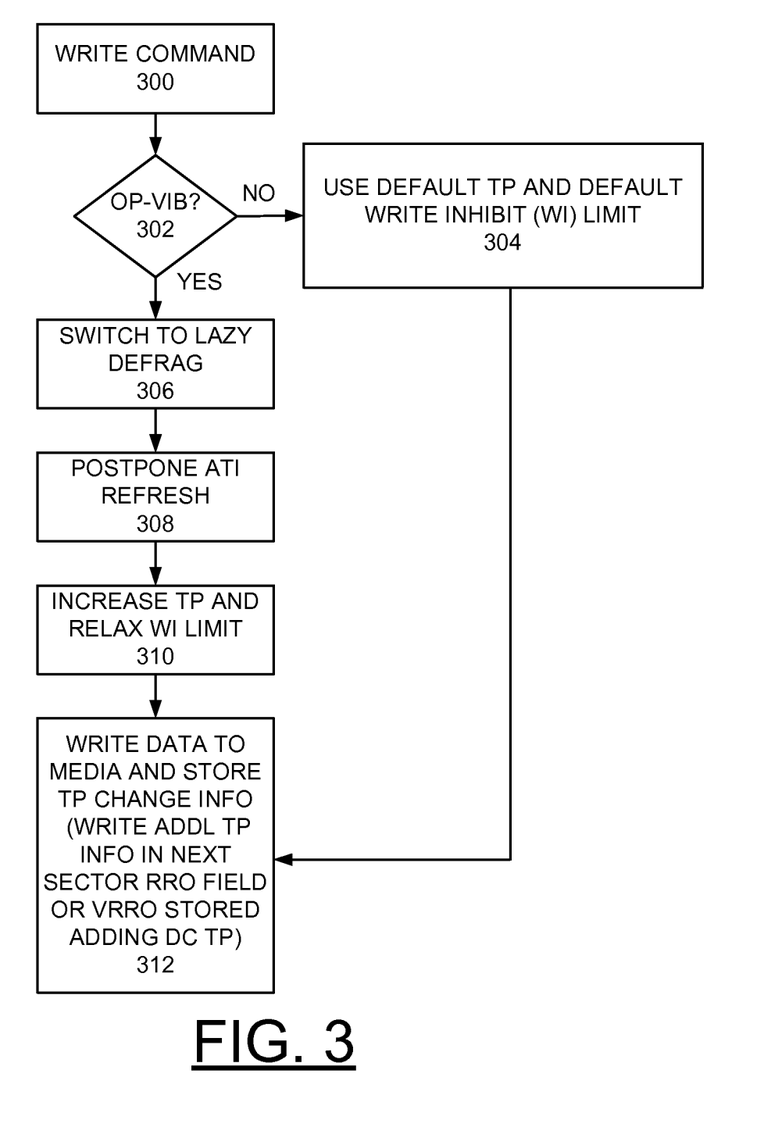
FIG. 3 is a flow chart illustrating example operations for implementing data track pitch adjustment method of the system of FIG. 1 in accordance with embodiments of the invention.

Referring now to FIG. 3, example operations, for example, performed by controller 114, start with a write command as indicated at a block 300. Responsive to the write command, checking for an operational vibration condition in accordance with an embodiment is performed as indicated at a decision block 302. When an operational vibration condition in accordance with an embodiment is not detected, a default track pitch (TP) and default write inhibit (WI) limit are used as indicated at a block 304 for the write command.

An operational vibration condition in accordance with an embodiment is detected at block 302 based upon operational vibration disturbance spectrum information provided by the sensor 132 to the controller 114, which advantageously includes either an accelerometer or a disturbance observer (DOB) running in a servo loop of channel 116.

Under operational vibration conditions, typically track mis-registration (TMR) degradation results in more write inhibit hits with more samples requiring additional revolutions. In addition to OS generated write commands, adjacent track interference (ATI) mitigation and shingled perpendicular magnetic recording (SMR) defragmentation schemes require additional write operations which are required to be performed in the background. Under operational vibration conditions, undesirable performance degradation results in order to maintain required data reliability.

In accordance with embodiments of the invention, responsive to the detected operational vibration disturbance spectrum information, operation is switched to lazy defrag as indicated at a block 306. With the lazy defrag operation at block 306, I-track defragmentation is not done. An ATI refresh is postponed as indicated at a block 308.

Figure 4A:
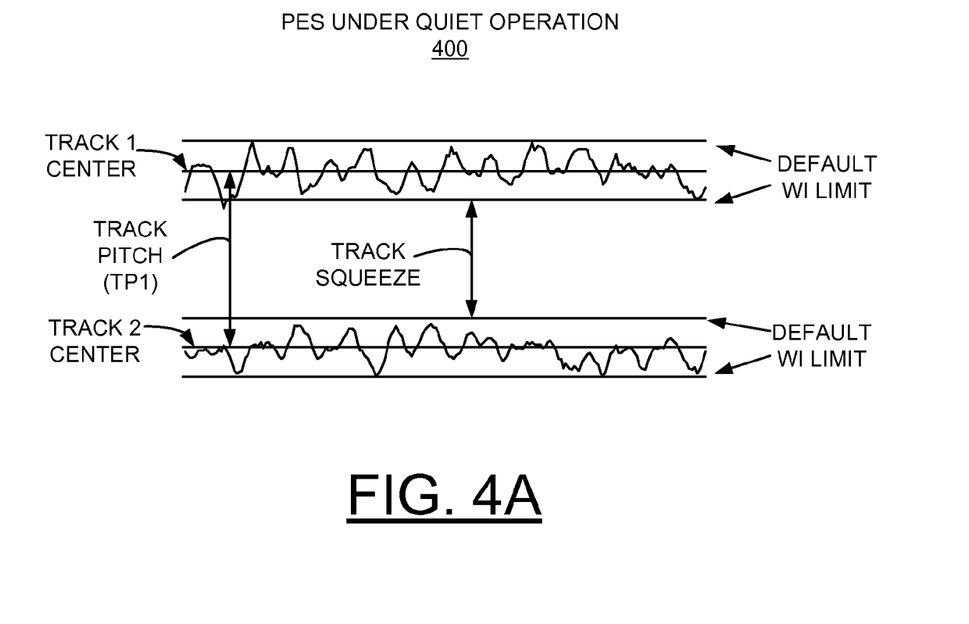
FIGS. 4A, 4B, and 4C are waveforms illustrating example track pitch adjustment operations of FIG. 3 in accordance with embodiments of the invention.
Figure 4B:
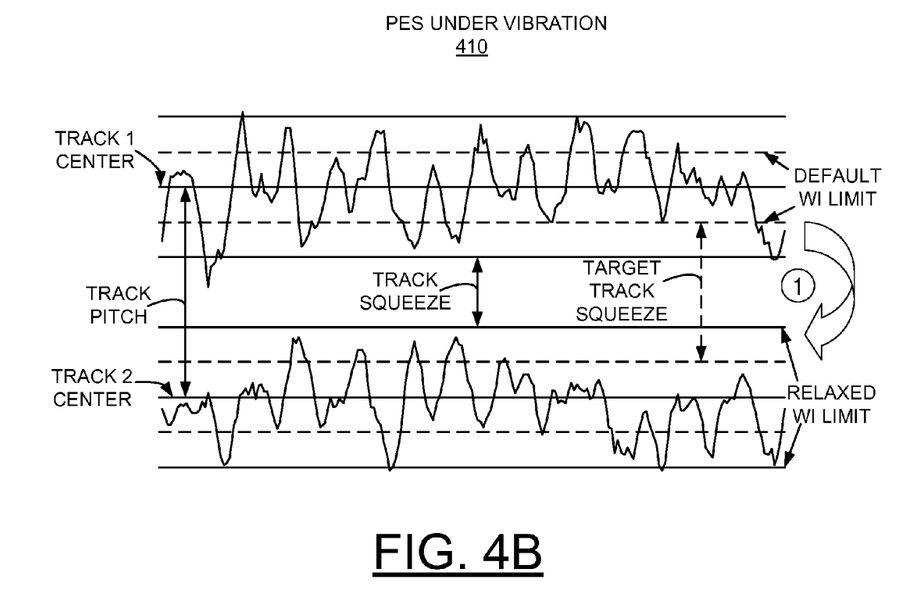
Figure 5:
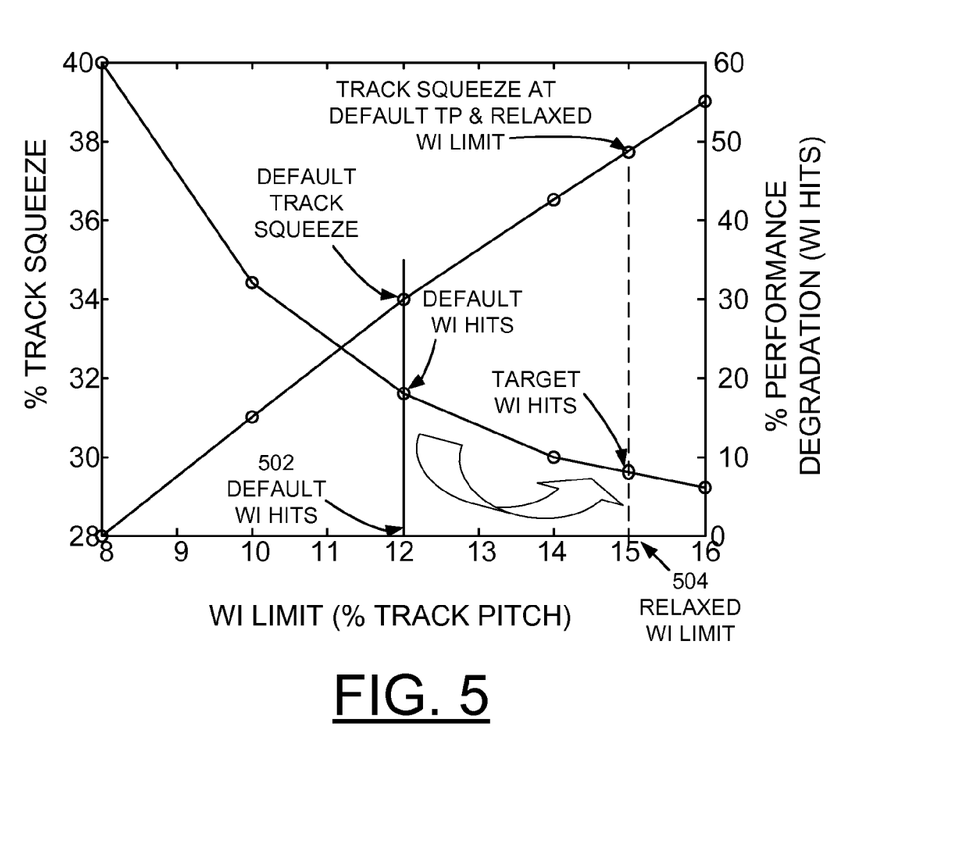
FIGS. 5, 6A, and 6B are example waveforms illustrating example operations for implementing data track pitch adjustment method of FIG. 3 of the system of FIG. 1 in accordance with embodiments of the invention.
Figure 6A:
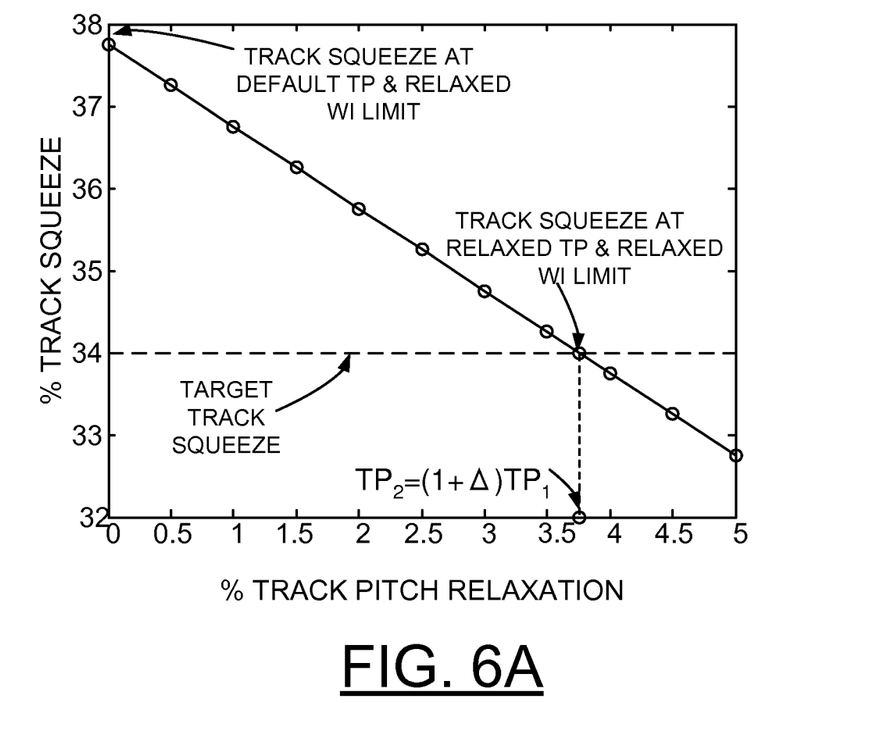
Figure 6B:
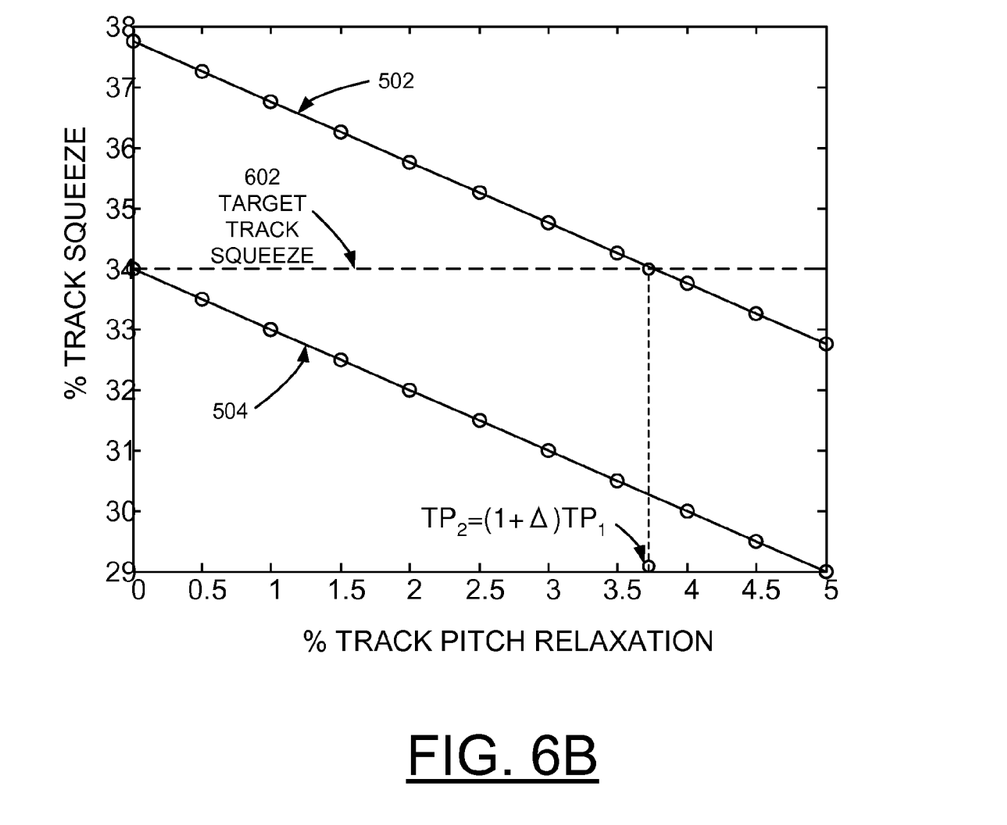

In accordance with embodiments of the invention, under operational vibration conditions, controller circuit 114 increases the track pitch and relaxes the write inhibit (WI) limit as indicated at a block 310, for example, as illustrated and described with respect to FIGS. 4B, 5 and 6. Then as indicated at a block 312, data is written to the media, and the track pitch change information is stored for use during read operation. For example, additional modified track pitch information is written in RRO fields or optionally compatible with Virtual RRO feature wherein the RRO data is saved in compressed tabular format. In accordance with embodiments of the invention, the stored VRRO information is modified by adding a DC term corresponding to the change in track pitch at block 312.

Figure 4C:
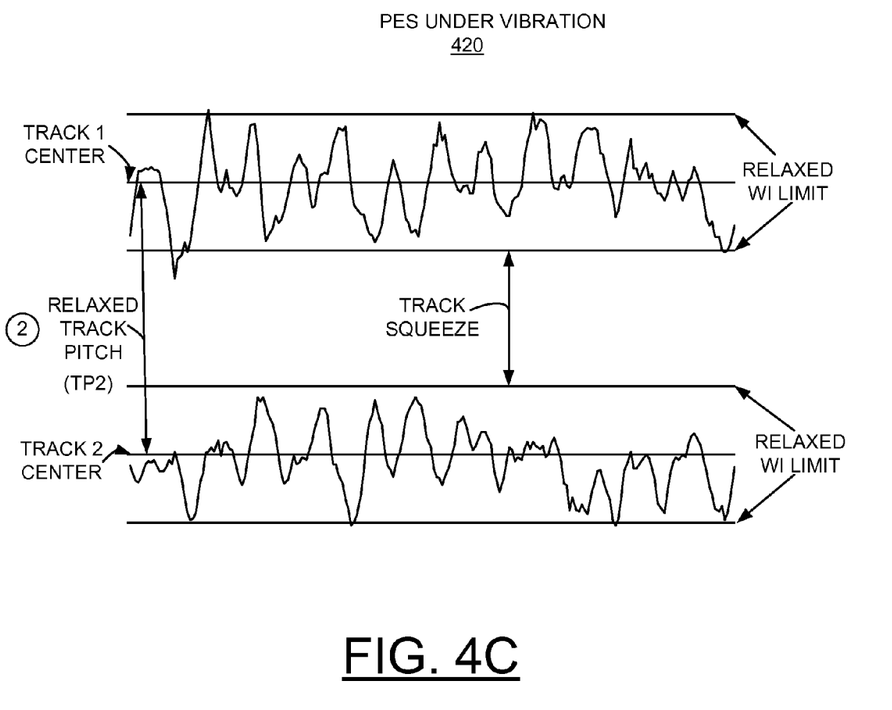

Referring also to FIGS. 4A, 4B, and 4C, there are shown waveforms in FIG. 4A illustrating example track pitch TP1 under quiet operation generally designated by the reference character 400 and in FIGS. 4B, and 4C responsive to detected operational vibration disturbance spectrum information generally designated by the reference character 410, and generally designated by the reference character 420 in accordance with embodiments of the invention.

Referring also to FIGS. 5, 6A, and 6B, there are example waveforms illustrating example operations for implementing data track pitch adjustment method of the preferred embodiments of the invention. As shown in FIG. 4B, under detected operational vibration conditions, first a relaxed WI LIMIT is computed as indicated at one (1) to satisfy performance requirement to provide a target WI, such as illustrated in FIG. 5, and the track pitch TP is increased to satisfy squeeze and data reliability requirement computed as indicated at two (2).

FIG. 5 illustrates data track squeeze relative to WI LIMIT, with multiple target operation points respectively shown at 502 and 504. As shown in FIGS. 6A, and 6B, data track squeeze is illustrated with respect to TPI relaxation at target performance including the multiple target operation points respectively indicated by 502, and 504 and a target track squeeze indicated by a dashed line 602. The adjusted track pitch provided responsive to detected operational vibration disturbance spectrum information is represented by $TP_2$ $$TP_2 = (1+\Delta)TP_1$$

where the quiet track pitch is represented by $TP_1$.

In accordance with embodiments of the invention, responsive to the detected operational vibration disturbance spectrum information, operation optionally includes alternative example skip data sector operations as illustrated and described with respect to FIGS. 7, 8A, 8B and 9 in accordance with embodiments of the invention.

Figure 7:
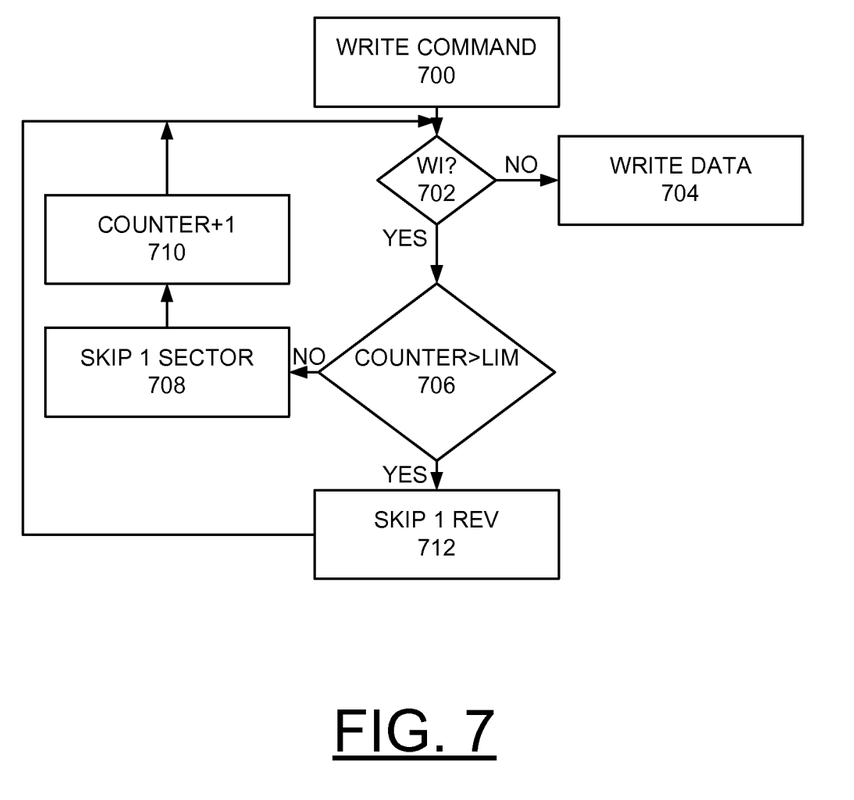
FIG. 7 is a flow chart illustrating alternative example operations for implementing an alternate data track pitch adjustment method of the system of FIG. 1 in accordance with embodiments of the invention.

Referring now to FIG. 7 there are shown alternative example operations example operations, for example, performed by controller 114, start with a write command as indicated at a block 700. Responsive to the write command, checking for a WI hit as indicated at a decision block 702. When the WI hit is not identified at decision block 702, then the data is written as indicated at a block 704.

When the WI hit is identified at decision block 702, then checking is performed to determine whether a counter value is greater than a limit LIM as indicated at a decision block 706. The limit LIM is provided to allow the threshold limit LIM number of samples outside the WI before retry to another revolution is provided. When the counter value is less than or equal to the limit LIM, then one sector is skipped as indicated at a block 708, and the counter is incremented by one as indicated at a block 710. Then checking whether the counter value is greater than a limit LIM is performed at decision block 702. When the counter value is greater than a limit LIM at decision block 706, the skipping one revolution is provided as indicated at a block 712. Then checking whether the counter value is greater than a limit LIM is performed at decision block 702.

Figure 8A:
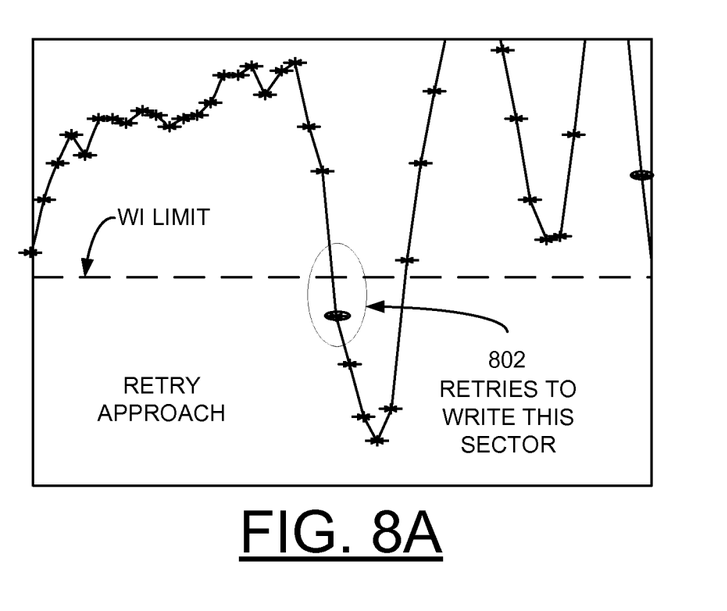
FIGS. 8A, 8B and 9 are example waveforms illustrating example operations for implementing an alternate data track pitch adjustment method of FIG. 7 of the system of FIG. 1 in accordance with embodiments of the invention.
Figure 8B:
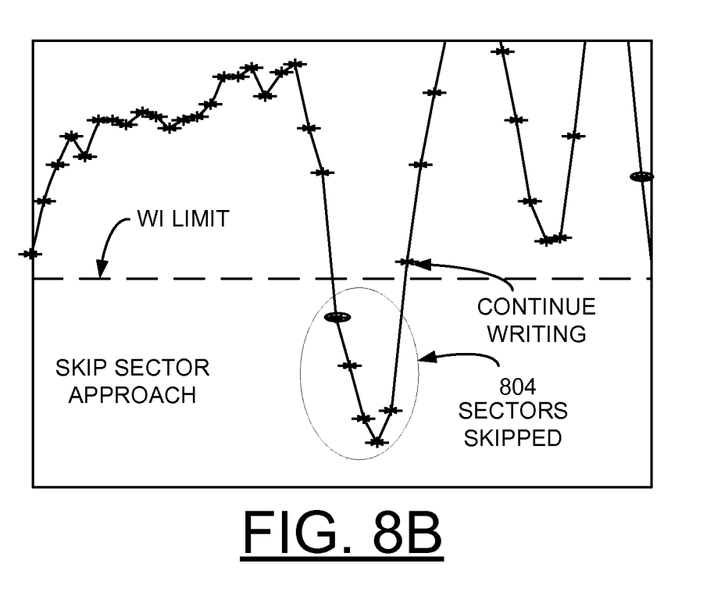
Figure 9:
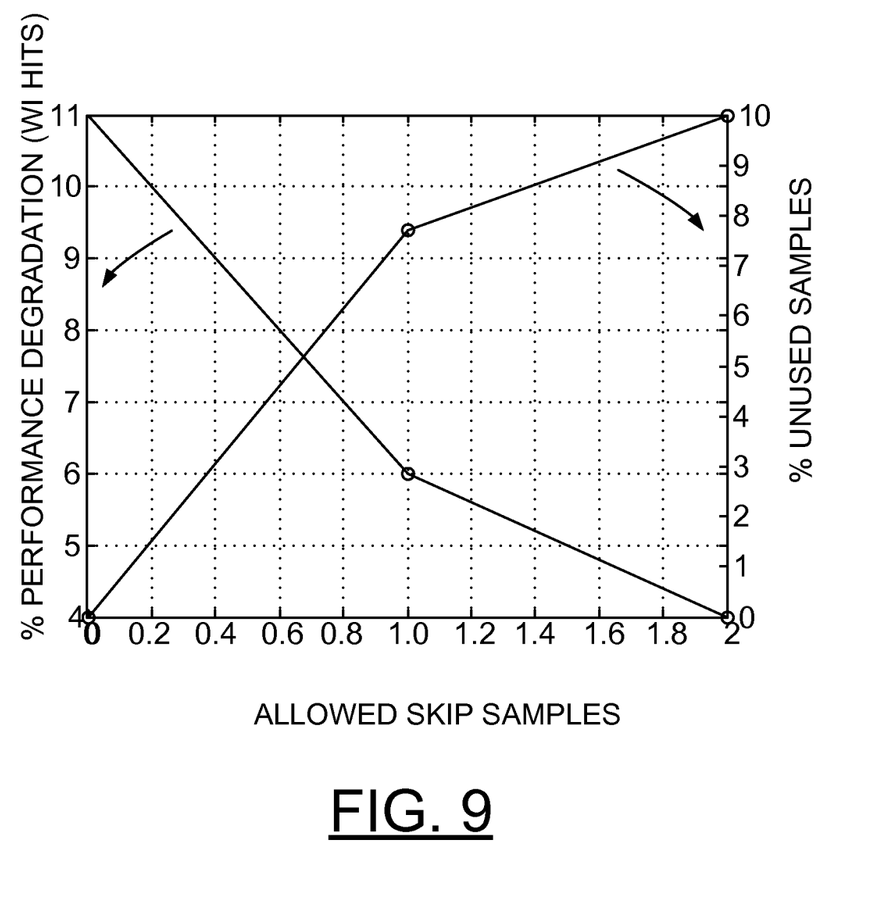

FIGS. 8A, 8B and 9 are example waveforms illustrating example operations of the alternative example skip data sector operations method of FIG. 7 in accordance with embodiments of the invention. A backup rewrite with every WI hit requires at least one revolution of delay. In FIG. 8A, the backup rewrite is indicated at 802 with retries to write this sector. In FIG. 8B, the skip write is indicated at 804 with a plurality of sectors skipped. The allowed specified number of sectors, such as 5 sectors, are allowed to be skipped with every data sector write. If WI, write can continue if WE is encountered within an allowable number of sector skips, as shown at continue writing in FIG. 8B. Otherwise another revolution is retried. The proposed alternative example skip data sector operations method is suitable for E-region or cache provides performance improvement eliminating the need to wait for additional revolutions, with only waiting for the Write Enabled (WE) being established after the WI. The capacity impact includes the number of data sectors that cannot be used while waiting for WE after WI.

An allowable sector skip per write retry can be established based on tradeoff curves of performance improvement versus capacity impact, for example as illustrated in FIG. 9. The benefits provided by the example skip data sector operations method of FIG. 7 depend on the frequency spectrum, and are more useful for low frequency operational vibration disturbances. The data track pitch adjustment method of FIG. 3 is relatively insensitive to the frequency spectrum.

Figure 10:
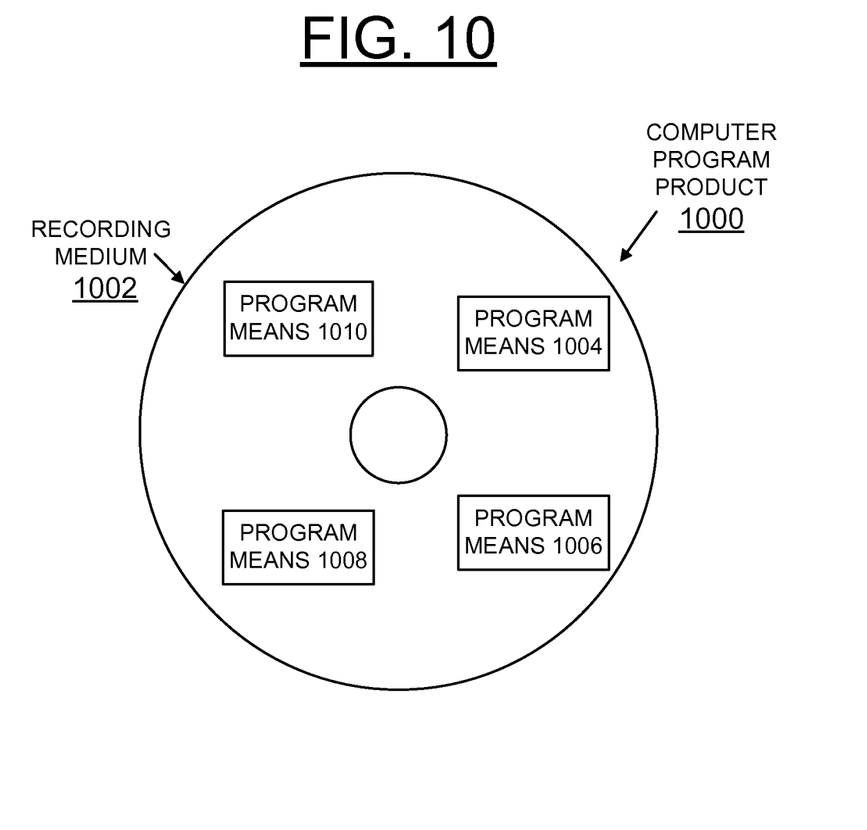
FIG. 10 is a block diagram illustrating a computer program product in accordance with embodiments of the invention.

Referring now to FIG. 10, an article of manufacture or a computer program product 1000 of the invention is illustrated. The computer program product 1000 includes a computer readable recording medium 1002, such as, a floppy disk, a high capacity read only memory in the form of an optically read compact disk or CD-ROM, a tape, or another similar computer program product. Computer readable recording medium 1002 stores program means or control code 1004, 1006, 1008, 1010 on the medium 1002 for carrying out the methods for implementing track pitch of the embodiments of the invention in the system 100 of FIG. 1.

A sequence of program instructions or a logical assembly of one or more interrelated modules defined by the recorded program means or control code 1004, 1006, 1008, 1010, direct the system 100 for implementing data confidentiality and integrity of stored data of the embodiments of the invention.

While the present invention has been described with reference to the details of the embodiments of the invention shown in the drawing, these details are not intended to limit the scope of the invention as claimed in the appended claims.

What is claimed is:

1. A method for implementing data track pitch adjustment for data written on a recordable surface of a storage device under operational vibration conditions comprising:
   detecting an operational vibration disturbance spectrum during a write operation;
   adjusting the data track pitch of data being written based on the detected operational vibration disturbance spectrum and saving track pitch information in firmware tables used during read operation.

2. The method as recited in claim 1 wherein detecting an operational vibration disturbance spectrum during a write operation includes using servo loop signal information for detecting the operational vibration disturbance spectrum.

3. The method as recited in claim 1 wherein adjusting the data track pitch of data being written based on the detected disturbance spectrum includes adjusting a write inhibit limit.

4. The method as recited in claim 1 wherein adjusting the data track pitch of data being written based on the detected disturbance spectrum includes computing a write inhibit limit based upon stored position error signal (PES) information.

5. The method as recited in claim 1 wherein adjusting the data track pitch of data being written based on the detected disturbance spectrum includes providing a wider data track pitch relative to a quiet data track pitch.

6. The method for implementing data track pitch adjustment for data written on a recordable surface of a storage device under operational vibration conditions comprising:
   detecting an operational vibration disturbance spectrum during a write operation;
   adjusting the data track pitch of data being written based on the detected operational vibration disturbance spectrum and providing a wider data track pitch relative to a quiet data track pitch including using a relaxed write inhibit limit for a target performance operation; and saving the adjusted track pitch information for use during a read operation.

7. The method as recited in claim 1 includes updating and adding track pitch information to repeatable run out (RRO) tables.

8. The method as recited in claim 1 includes using a dedicated region on the recordable surface for data being written based on the detected operational vibration disturbance spectrum.

9. An apparatus for implementing data track pitch adjustment for data written on a recordable surface of a storage device under operational vibration conditions comprising:
  an operational vibration sensor detecting an operational vibration disturbance spectrum during a write operation;
  a controller coupled to said operational vibration sensor, said controller adjusting the data track pitch of data being written based on the detected operational vibration disturbance spectrum; and said controller saving track pitch information in firmware tables used during read operation.

10. The apparatus as recited in claim 9, includes control code stored on a computer readable medium, and wherein said controller uses said control code for implementing data track pitch adjustment of data written.

11. The apparatus as recited in claim 9, wherein said operational vibration sensor uses servo loop signal information for detecting the operational vibration disturbance spectrum.

12. The apparatus as recited in claim 9, wherein said controller adjusting the data track pitch of data being written based on the detected disturbance spectrum includes said controller adjusting a write inhibit limit.

13. The apparatus as recited in claim 9, wherein said controller adjusting the data track pitch of data being written based on the detected disturbance spectrum includes said controller computing a write inhibit limit based upon stored position error signal (PES) information.

14. The apparatus as recited in claim 9, wherein said controller adjusting the data track pitch of data being written based on the detected disturbance spectrum includes said controller providing a wider data track pitch relative to a quiet data track pitch.

15. The apparatus as recited in claim 9, wherein said controller saving the adjusted track pitch information for use during read operation includes said controller updating and adding track pitch information to repeatable run out (RRO) tables.

16. A data storage device comprising:
  at least one disk; said disk including a recordable surface;
  an operational vibration sensor detecting an operational vibration disturbance spectrum during a write operation;
  a controller coupled to said operational vibration sensor, said controller adjusting the data track pitch of data being written based on the detected operational vibration disturbance spectrum and said controller saving track pitch information in firmware tables used during read operation.

17. The data storage device as recited in claim 16, wherein said operational vibration sensor uses servo loop signal information for detecting the operational vibration disturbance spectrum.

18. The data storage device as recited in claim 16, wherein said controller adjusting the data track pitch of data being written based on the detected disturbance spectrum includes said controller computing a write inhibit limit based upon stored position error signal (PES) information.

* * * * *